United States Patent
Kutsch et al.

(10) Patent No.: US 8,135,701 B2
(45) Date of Patent: *Mar. 13, 2012

(54) SELECTIVITY ESTIMATION FOR CONJUNCTIVE PREDICATES IN THE PRESENCE OF PARTIAL KNOWLEDGE ABOUT MULTIVARIATE DATA DISTRIBUTIONS

(75) Inventors: Marcel Kutsch, Cologne (DE); Volker Gerhard Markl, San Jose, CA (US); Nimrod Megiddo, Palo Alto, CA (US); Tam Minh Dai Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 777 days.

This patent is subject to a terminal disclaimer.

(21) Appl. No.: 12/042,065

(22) Filed: Mar. 4, 2008

(65) Prior Publication Data

US 2008/0154846 A1 Jun. 26, 2008

Related U.S. Application Data

(63) Continuation of application No. 11/190,947, filed on Jul. 28, 2005, now Pat. No. 7,376,639.

(51) Int. Cl.
*G06F 7/00* (2006.01)
(52) U.S. Cl. .................................................. 707/713
(58) Field of Classification Search ........... 707/999.002, 707/713
See application file for complete search history.

(56) References Cited

U.S. PATENT DOCUMENTS

| 5,469,568 | A | 11/1995 | Schiefer et al. | |
|---|---|---|---|---|
| 5,542,073 | A | 7/1996 | Schiefer et al. | |
| 5,864,841 | A | 1/1999 | Agrawal et al. | |
| 6,477,523 | B1 | 11/2002 | Chiang | |
| 6,738,755 | B1 | 5/2004 | Freytag et al. | |
| 6,763,359 | B2 | 7/2004 | Lohman et al. | |
| 6,961,685 | B2 | 11/2005 | Sy | |
| 2002/0111780 | A1* | 8/2002 | Sy ..................................... | 703/2 |
| 2003/0115183 | A1* | 6/2003 | Abdo et al. ....................... | 707/3 |
| 2004/0181521 | A1* | 9/2004 | Simmen ........................... | 707/3 |
| 2004/0267713 | A1 | 12/2004 | Chaudhuri et al. | |
| 2005/0004907 | A1 | 1/2005 | Bruno et al. | |
| 2005/0097072 | A1* | 5/2005 | Brown et al. ..................... | 707/1 |

OTHER PUBLICATIONS

Getoor et al., "Selectivity Estimation Using Probabilistic Models," ACM SIGMOD 2001, May 21-24, Santa Barbara, CA, pp. 461-472.
Deshpande et al., "Independence is Good: Dependency-Based Histogram Synopses for High-Dimensional Data," ACM SIGMOD 2001, May 21-24, Santa Barbara, CA, pp. 199-210.
Wang et al., "Estimating the Selectivity of XML Path Expression with Predicates by Histograms," The 5th Int'l Conf. on WAIM, Jul. 15-17, 2004, Dalian, China, pp. 410-418.

(Continued)

*Primary Examiner* — Jensen Hu
(74) *Attorney, Agent, or Firm* — IP Authority, LLC; Ramraj Soundararajan

(57) ABSTRACT

A method for consistent selectivity estimation based on the principle of maximum entropy (ME) is provided. The method efficiently exploits all available information and avoids the bias problem. In the absence of detailed knowledge, the ME approach reduces to standard uniformity and independence assumptions. The disclosed method, based on the principle of ME, is used to improve the optimizer's cardinality estimates by orders of magnitude, resulting in better plan quality and significantly reduced query execution times.

9 Claims, 4 Drawing Sheets

```
Input:
    partial knowledge of a probability distribution,
    with known s_Y for every Y ∈ T ⊂ 2^N (∅ ∈ T)
Output:
    An approximate ME solution x_b for all atoms b
    ∈ {0, 1}^n
1    FOR X ∈ T: z_X := 1;  // ENDFOR X
2    ε := 10^-6;
3    Δz := ε; Δz^0 := 10 * ε;
4    WHILE abs(Δz^0 - Δz) > ε
5       Δz^0 := Δz; Δz := 0;
6       FOR Y ∈ T:
7          sum := 0
8          FOR b ∈ C(Y)
9             product := 1
10            FOR X ∈ P(b,T)\Y
11               product *= z_X;  // ENDFOR X
12            sum += product;  // ENDFOR b
13a         z_Y^0 := z_Y;
13b         z_Y := (s_Y * e) / sum ;
14          Δz += abs(z_Y^0 / z_Y);  // ENDFOR Y
```

OTHER PUBLICATIONS

Chaudhuri et al., "Selectvity Estimation for String Predicates: Overcoming the Underestimation Problem," Proc. of 20th ICDE 2004, Mar. 30-Apr. 2, Boston, MA, 13pgs.

Chung et al., "An Efficient Selectivity Estimation Method for Spatial Query Optimization with Topological Relationships," Journal of Chongqing University of Posts and Telecommunications (Natural Science), V16, N5, Oct. 2004, pp. 113-120.

Bruno, "Conditional Selectivity for Statistics on Query Expressions," copyright 2004 ACM.

* cited by examiner

FIG. 1A-C

PRIOR ART

| | |
|---|---|
| Input: | |
| | partial knowledge of a probability distribution, with known $s_Y$ for every $Y \in T \subset 2^N$ ($\emptyset \in T$) |
| Output: | |
| | An approximate ME solution $x_b$ for all atoms $b \in \{0, 1\}^n$ |
| 1 | FOR $X \in T$: $z_X := 1$; // ENDFOR $X$ |
| 2. | $\varepsilon := 10^{-6}$; |
| 3. | $\Delta z := \varepsilon$; $\Delta z^0 := 10 * \varepsilon$; |
| 4. | WHILE abs($\Delta z^0 - \Delta z$) > $\varepsilon$ |
| 5 | $\Delta z^0 := \Delta z$; $\Delta z := 0$; |
| 6. | FOR $Y \in T$: |
| 7. | $sum := 0$ |
| 8. | FOR $b \in C(Y)$ |
| 9. | $product := 1$ |
| 10 | FOR $X \in P(b,T) \backslash Y$ |
| 11. | $product \mathrel{*}= z_X$; // ENDFOR $X$ |
| 12. | $sum \mathrel{+}= product$; // ENDFOR $b$ |
| 13a | $z_Y^0 := z_Y$; |
| 13b | $z_Y := \dfrac{s_Y * e}{sum}$; |
| 14. | $\Delta z \mathrel{+}= \text{abs}\left(\dfrac{z_Y^0}{z_Y}\right)$; // ENDFOR $Y$ |

FIG. 4

SELECTIVITY ESTIMATION FOR CONJUNCTIVE PREDICATES IN THE PRESENCE OF PARTIAL KNOWLEDGE ABOUT MULTIVARIATE DATA DISTRIBUTIONS

This application is a continuation of U.S. application Ser. No. 11/190,947, filed Jul. 28, 2005.

BACKGROUND OF THE INVENTION

1. Field of Invention

The present invention relates generally to the field of query plan optimization in relational databases. More specifically, the present invention is related to optimizing query plans having conjunctive predicates.

2. Discussion of Related Art

Estimating the selectivity of predicates has always been a challenging task for a query optimizer in a relational database management system. A classic problem has been the lack of detailed information about the joint frequency distribution of attribute values in a table of interest. Perhaps ironically, the additional information now available to modern query optimizers has, in a certain sense, made the selectivity-estimation problem even more difficult.

Specifically, consider the problem of estimating the selectivity $s_{1,2,\ldots,n}$ of a conjunctive predicate of the form $p_1 \wedge p_2 \wedge \ldots \wedge p_n$, where each $p_i$ is either a simple predicate, also known as a Boolean Factor (BF) of the form "column op literal". Here column is a column name, op is a relational comparison operator such as "=", ">", or "LIKE", and literal is a literal in the domain of the column; some examples of simple predicates are 'make="Honda"' and 'year>1984'. The phrase "selectivity of a predicate p" is used to indicate the fraction of rows in the table that satisfy p. In older optimizers, statistics are maintained on each individual column, so that the individual selectivities $s_1, s_2, \ldots, s_n$ of $p_1, p_2, \ldots, p_n$ are available. Such a query optimizer would then impose an independence assumption and estimate the desired selectivity as $s_{1,2,\ldots,n} = s_1 * s_2 * \ldots * s_n$. Such estimates ignore correlations between attribute values, and consequently can be wildly inaccurate, often underestimating the true selectivity by orders of magnitude and leading to a poor choice of query execution plan (QEP).

As an example of using the uniformity assumption, assuming ten distinct values in the MAKE column, the selectivity of the predicate $p_1$: 'MAKE="Honda"' is estimated as $s_1 = 1/10$. Similarly, with 100 distinct values in the MODEL column and 10 distinct values in the COLOR column, we obtain $s_2 = 1/100$ for $p_2$: MODEL="Accord" and $s_3 = 1/10$ for $p_3$: COLOR="red". Advanced commercial optimizers can improve upon these basic estimates by maintaining frequency histograms on the values in individual columns.

As indicated previously, in the absence of other information, current optimizers compute the selectivity of a conjunctive predicate using the independence assumption. For instance, $p_{1,2,3} = p_1 \wedge p_2 \wedge p_3$ is the predicate restricting a query to retrieve all red Honda Accords, and the selectivity of $p_{1,2,3}$ is computed as $s_{1,2,3} = s_1 * s_2 * s_3$. In the previous example, the optimizer would estimate the selectivity of red Honda Accords to be $1/10000$. As only Honda is the only automobile manufacturer to make Accords, there is a strong correlation between these two columns, and in this case, an actual functional dependency. The actual selectivity of $p_{1,2}$ must be $1/100$. Thus, a more appropriate estimate of the selectivity of $p_{1,2,3}$ is $1/1000$, which is one order of magnitude greater than the estimate using the independence assumption.

Ideally, to overcome the issues associated with the independence assumption, the optimizer should store a multidimensional joint frequency distribution for all of the columns in the database. In practice, the amount of storage required for the full distribution is exponentially large, making this approach infeasible. It has therefore been proposed to store selected multivariate statistics (MVS) that summarize important partial information about the joint distribution. Proposals have ranged from multidimensional histograms on selected columns to other, simpler forms of column-group statistics. Thus, for predicates $p_1, p_2, \ldots, p_n$, the optimizer typically has access to the individual selectivities $s_1, s_2, \ldots, s_n$ as well as a limited collection of joint selectivities, such as $s_{1,2}, s_{3,5}$, and $s_{2,3,4}$. The independence assumption is then used to "fill in the gaps" in the incomplete information; it is now possible to estimate the unknown selectivity $s_{1,2,3}$ by $s_{1,2} * s_3$.

A new and serious problem now arises, however. There may be multiple, non-equivalent ways of estimating the selectivity for a given predicate. FIG. 1, for example, shows possible QEPs for a query consisting of the conjunctive predicate $p_1 \wedge p_2 \wedge p_3$. The QEP in FIG. 1(a) uses an index-ANDing operation ($\wedge$) to apply $p_1 \wedge p_2$ and afterwards applies predicate $p_3$ by a FETCH operator, which retrieves rows from a base table according to the row identifiers returned from the index-ANDing operator. Supposing that the optimizer knows the selectivities $s_1, s_2, s_3$ of the BFs $p_1, p_2, p_3$ as well as about a correlation between $p_1$ and $p_2$ via knowledge of the selectivity $s_{1,2}$ of $p_1 \wedge p_2$; using independence, the optimizer might then estimate the selectivity of $p_1 \wedge p_2 \wedge p_3$ as $s^a_{1,2,3} = s_{1,2} * s_3$.

FIG. 1(b) shows an alternative QEP that first applies $p_1 \wedge p_3$ and then applies $p_2$. If the optimizer also knows the selectivity $s_{1,3}$ of $p_1 \wedge p_3$, use of the independence assumption might yield a selectivity estimate $s^b_{1,2,3} = s_{1,3} * s_2$. However, this would result in an inconsistency if, as is likely, $s^a_{1,2,3} \neq s^b_{1,2,3}$. Potentially, there can be other choices, such as $s_1 * s_2 * s_3$ or, if $s_{2,3}$ is known, $s_{1,2} * s_{2,3} / s_2$; the latter estimate amounts to a conditional independence assumption. Any choice of estimate will be arbitrary, since there is no supporting knowledge to justify ignoring a correlation or assuming conditional independence; such a choice would arbitrarily bias the optimizer toward choosing one plan over another. Even worse, if the optimizer does not utilize the same choice of estimate every time that it is required, then different plans will be costed inconsistently, leading to "apples and oranges" comparisons and unreliable plan choices.

Assuming that the QEP in FIG. 1(a) is the first to be evaluated, a modern optimizer would avoid the foregoing consistency problem by recording the fact that $s_{1,2}$ was applied and then avoiding future application of any other MVS that contain either $p_1$ or $p_2$, but not both. In the exemplary figure, the selectivities for the QEP in FIG. 1(c) would be used whereas the selectivities in FIG. 1(b) would not. The optimizer would therefore compute the selectivity of $p_1 \wedge p_3$ to be $s_1 * s_3$ using independence, instead of using the MVS $s_{1,3}$. Thus, the selectivity $s_{1,2,3}$ would be estimated in a manner consistent with FIG. 1(a). Note that, when evaluating the QEP in FIG. 1(a), the optimizer used the estimate $s^a_{1,2,3} = s_{1,2} * s_3$ rather than $s_1 * s_2 * s_3$, since, intuitively, the former estimate better exploits the available correlation information. In general, there may be many possible choices; the complicated (ad hoc) decision algorithm used by DB2 UDB is described in more detail subsequently.

Cardinality Estimation for Conjunctive Predicates with MVS in DB2

In the absence of a complete set of statistical information, and due to the complexity and the cost of collecting such information, the DB2 UDB optimizer tries to exploit as much statistical data as is available. Shown below are four different scenarios in which it is assumed that the selectivities of simple predicates are known.

Case I: No Statistics on Conjunctive Predicates are Known.
For this trivial case, the selectivity of the conjunctive predicate is the product of the selectivities of the individual predicates.
Example:
Estimate $s_{1,2,3}$ given $s_1$, $s_2$, and $s_3$.

$$s_{1,2,3} = s_1 * s_2 * s_3.$$

Case II: Statistics on the Conjunctive Predicates are Known and there Exists a Conjunctive Predicate Whose BFs Match the Set of Predicates Whose Combined Selectivity is to be Determined.
For this simple case, the selectivity of the full conjunctive predicate is the selectivity of the conjunctive predicate whose BFs match the set of predicates in question.
Example:
(a) Estimate $s_{1,2,3}$ given $s_{1,2,3}$.

$$s_{1,2,3} = s_{1,2,3}.$$

(b) Estimate $s_{1,2,3}$ given $s_{1,2}$, $s_{2,3}$, and $s_{1,2,3}$.

$$s_{1,2,3} = s_{1,2,3}.$$

Case III: Statistics on the Conjunctive Predicates are Known and there Exist Some Conjunctive Predicates Whose Intersection is an Empty Set.
In this case, the selectivity of the conjunctive predicate is the product of the selectivities of all conjunctive predicates and the selectivities of the individual predicates not participating in any conjunctive predicate.
Example:
(a) Estimate $s_{1,2,3,4,5}$ given $s_{1,2}$ and $s_{3,4}$ $$s_{1,2,3,4,5} = s_{1,2} * s_{3,4} * s_5.$$

(b) Estimate $s_{1,2,3,4,5}$ given $s_{1,2,5}$ and $s_{3,4}$ $$s_{1,2,3,4,5} = s_{1,2,5} * s_{3,4}.$$

Although the ad hoc method described above ensures consistency, it ignores valuable knowledge, for example, the correlation between $p_1$ and $p_3$. Moreover, this method complicates the logic of the optimizer, because cumbersome bookkeeping is required to keep track of how an estimate was initially derived and to ensure that it will always be computed in the same way when costing other plans. Even worse, ignoring the known correlation between $p_1$ and $p_3$ also introduces bias towards certain QEPs: if, as is often the case with correlation, $s_{1,3} \gg s_1 * s_3$, and $s_{1,2} \gg s_1 * s_2$, and if $s_{1,2}$ and $s_{1,3}$ have comparable values, then the optimizer will be biased towards the plan in FIG. 1(c), even though the plan in FIG. 1(a) might be cheaper. In general, an optimizer will often be drawn towards those QEPs about which it knows the least, because use of the independence assumption makes these plans seem cheaper due to underestimation. Query optimizers that do not use MVS actually estimate their selectivities for conjunctive queries according to the ME principle: they assume uniformity when no information about column distributions is available, and they assume independence because they do not know about any correlations.

One approach to query optimization is to utilize the maximum entropy principle. The maximum entropy principle models all that is known and assumes nothing about the unknown. It is a method for analyzing the available information in order to determine a unique epistemic probability distribution. Information theory defines for a probability distribution p a measure of uncertainty called entropy: $H(p) = -\Sigma_i p_i \log p_i$. The ME principle prescribes selection of the unique probability distribution that maximizes the entropy function H(p) consistently with respect to the known information. Entropy maximization without any additional information uses the single constraint that the sum of all probabilities is equal to one. The ME probability distribution then is the uniform distribution. When constraints only involve marginals of a multivariate distribution, the ME solution coincides with the independence assumption.

SUMMARY OF THE INVENTION

The present invention first formalizes the problem of consistency issues and bias during QEP evaluation in the presence of partial knowledge about the joint frequency distribution (as embodied in the available MVS). Subsequently, the ME approach to unbiased, efficient, and consistent selectivity estimation is applied, exploiting all available information, for cardinality estimation. The present invention incorporates partial information about multivariate information about multivariate distributions in a constrained optimization by modeling one or more multivariate distributions based on available statistical information, while taking into account all available distributional information and modeling one or more multivariate distributions for which no statistical information is available by maximizing information entropy for each multivariate distribution. Known selectivities are obtained from multidimensional histograms, column group statistics, index statistics, intermediate table statistics, or data learned during query execution.

The present invention also provides for a database query optimizer computing cardinalities of each partial query execution plan, wherein the database query optimizer comprises a selectivity computing unit to compute the selectivity of one or more predicates based on known statistical information in a given probability space, and a missing selectivity computing unit to compute missing selectivities using constrained optimization approach and entropy maximization over the entire probability space. In this embodiment, the computed selectivities based on statistical information and computed missing selectivities based on constrained optimization approach and entropy maximization are used to provide improved cardinality estimates and reduced query execution times.

The present invention approach to incorporate partial information about multivariate distributions in a constrained optimization form comprises: modeling one or more multivariate distributions based on available statistical information in a probability space, and modeling one or more multivariate distributions for which no statistical information is available via a constrained optimization approach and entropy maximization over the entire probability space. The present invention takes into account all available statistical information.

The constrained optimization approach further comprises: defining a selectivity, $x_b$, associated with each atom, $\wedge_{i \in N} p_i^{b_i}$, for $b_i \in \{0,1\}$ (each atom representing a term in disjunctive normal form (DNF) over a predicate space of n predicates $p_i$), forming a plurality of constraints based on known selectivities, and computing a solution for all atoms $x_b$, $b_i \in \{0,1\}$ that maximizes entropy while minimizing the function $\Sigma_{b \in \{0,1\}^n} x_b \log x_b$ and satisfying said plurality of constraints.

In one embodiment, the present invention further partitions, during preprocessing, a predicate space into independent components of nonintersecting knowledge based on both available knowledge and additional information about relevance of selectivities within each component.

In another embodiment, the present invention further identifies, a priori, one or more atoms b for which input knowledge T implies that selectivity $x_b$ is zero, and excluding such atoms in computations of said constrained optimization approach.

In yet another embodiment, the present invention further partitions, during preprocessing, a predicate space into independent components of nonintersecting knowledge based on both available knowledge and additional information about relevance of selectivities within each component; identifies, a priori, one or more atoms b for which input knowledge T implies that selectivity $x_b$ is zero, and excludes such atoms in computations of said constrained optimization approach.

Computing a solution for all atoms $x_b$, $b_i \in \{0,1\}$ that maximizes entropy while minimizing the function $\Sigma_{b \in \{0,1\}^n} x_b \log x_b$ and satisfying said plurality of constraints is accomplished via any of the following: the iterative scaling algorithm, the Newton-Raphson method, or closed formulas.

In one embodiment the constrained optimization solution is used for cardinality estimation in a database query optimizer.

BRIEF DESCRIPTION OF THE DRAWINGS

FIG. 4 illustrates the iterative scaling algorithm embodiment of the present invention.

DESCRIPTION OF THE PREFERRED EMBODIMENTS

Figure 1:
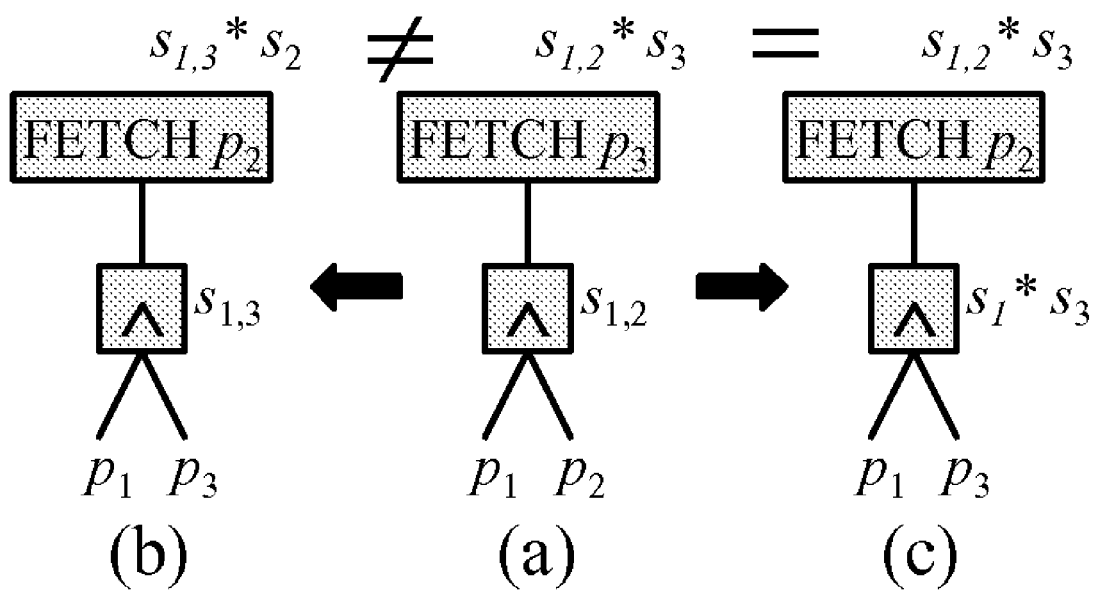
FIGS. 1(a)-(c) illustrate a plurality of QEPs and associated selectivity estimates.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The problem of selectivity estimation for conjunctive predicates, given partial MVS, is formalized using the following terminology. Let $P=\{p_1, \ldots, p_n\}$ be a set of BFs. For any $X \subseteq N=\{1, \ldots, n\}$, denote by $p_X$ the conjunctive predicate $\wedge_{i \in X} p_i$. Let s be a probability measure over $2^N$, with the interpretation that $s_X$ is the selectivity of the predicate $p_X$. Usually, for $|X|=1$, the histograms and column statistics from the system catalog determine $s_X$ and are all known. For $|X|>1$, the MVS may be stored in the data-base system catalog either as multidimensional histograms, index statistics, or some other form of column-group statistics or statistics on intermediate tables. In practice, $s_X$ is not known for all possible predicate combinations due to the exponential number of combinations of columns that can be used to define MVS. Suppose that $s_X$ is known for every X in some collection $T \subseteq 2^N$. Note that the empty set $\emptyset$ is part of T, as $s_\emptyset=1$ when applying no predicates. Also note that $2^N$ denotes the power-set of N. Then the selectivity estimation problem is to compute $s_X$ for $X \in 2^N \setminus T$.

The Constrained Optimization Problem

For each predicate p, write $p^1=p$ and $p^0=\neg p$. An atom is a term in disjunctive normal form (DNF) over the space of n predicates, i.e., a term of the form $\wedge_{i \in N} p_i^{b_i}$ for $b_i \in \{0,1\}$. We use $b=(b_1, \ldots, b_n) \in \{0,1\}^n$ to denote the atom $\wedge_{i \in N} p_i^{b_i}$. As a further abbreviation, parentheses and commas are omitted when denoting a specific atom. For example, using $P=\{p_1, p_2, p_3\}$ with $|P|=3$, the vector (1,0,0) is denoted by 100 and thus the atom $p_1 \wedge \neg p_2 \neg p_3$. For each predicate $p_X$, $X \in 2^N$, denote by C(X) the set of components of X, i.e., the set of all atoms contributing to $p_X$. Formally, $$C(X)=\{b \in \{0,1\}^n | \forall i \in X : b_i=1\} \text{ and}$$

$$C(\emptyset)=\{0,1\}^n$$

For the predicates $p_1$ and $p_{1,2}$ the following are obtained:

$$C(\{1\})=\{100,110,101,111\}$$

$$C(\{1,2\})=\{110,111\}.$$

Additionally, for every $T \subseteq 2^N$, we denote by P(b,T) the set of all known $X \in T \subseteq 2^N$ such that $p_X$ has b as an atom in its DNF representation, i.e., $P(b,T)=\{X \in T | \forall i \in X: b_i=1\} \cup \{\emptyset\}$. For the atom 011 and $T=2^{\{1,2,3\}}$ we obtain the set $P(b,T)=\{\{2\}, \{3\}, \{2,3\}, \emptyset\}$. Let $x_b$ denote the selectivity of an atom, with $x_b \geq 0$. Given $s_X$ for $X \in T$, we compute $s_X$ for $X \notin T$ according to the ME principle. To this end, we must solve the following constrained optimization problem:

$$\text{minimize } \Sigma_{b \in \{0,1\}^n} x_b \log x_b \qquad (1)$$

given the |T| constraints $$\Sigma_{b \in C(X)} x_b = s_X \text{ for all } X \in T \qquad (2)$$

The constraints are the known selectivities. The solution is a probability distribution with the maximum value of uncertainty, entropy, subject to the constraints. One of the included constraints is $s_\emptyset = \Sigma_{b \in \{0,1\}^n} x_b = 1$, which asserts that the combined selectivity of all atoms is 1.

Figure 2:
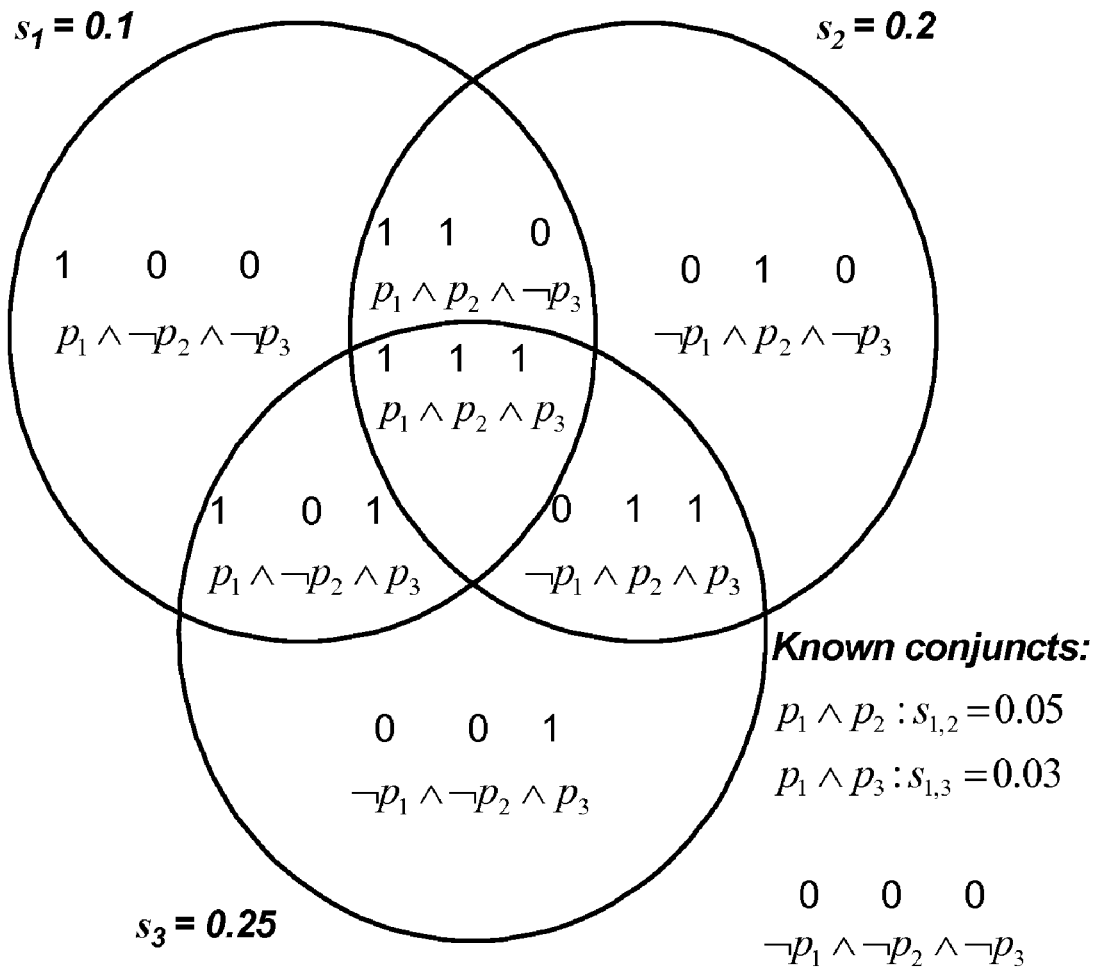
FIG. 2 illustrates an example probability space given some known conjunctive predicate estimates.

Referring now to FIG. 2, the probability space created for the predicate space created by $N=\{1,2,3\}$ and the knowledge set $T=\{\{1\}, \{2\}, \{3\}, \{1,2\}, \{1,3\}, \emptyset\}$ with the selectivities $s_1=0.1$, $s_2=0.2$, $s_3=0.25$, $s_{12}=0.05$, $s_{13}=0.03$, and $s_\emptyset=1$ is shown. The example in FIG. 2 results in the following six constraints:

$$s_1 = x_{100} + x_{110} + x_{101} + x_{111} = 0.1 \qquad (I)$$

$$s_2 = x_{010} + x_{011} + x_{110} + x_{111} = 0.2 \qquad (II)$$

$$s_3 = x_{001} + x_{011} + x_{101} + x_{111} = 0.25 \qquad (III)$$

$$s_{1,2} = x_{110} + x_{111} = 0.05 \qquad (IV)$$

$$s_{1,3} = x_{101} + x_{111} = 0.03 \qquad (V)$$

$$s_\emptyset = \Sigma_{b \in \{0,1\}^3} x_b = 1 \qquad (VI)$$

The task of selectivity estimation is to now compute a solution for all atoms $x_b$, $b \in \{0,1\}^3$ that maximizes the entropy function $-\Sigma_{b \in \{0,1\}^3} x_b \log x_b$ and satisfies the above six constraints. All $s_i$, $i \in 2^{\{1,2,3\}}$, can then be computed from the $x_b$ using formula (2).

Figure 3:
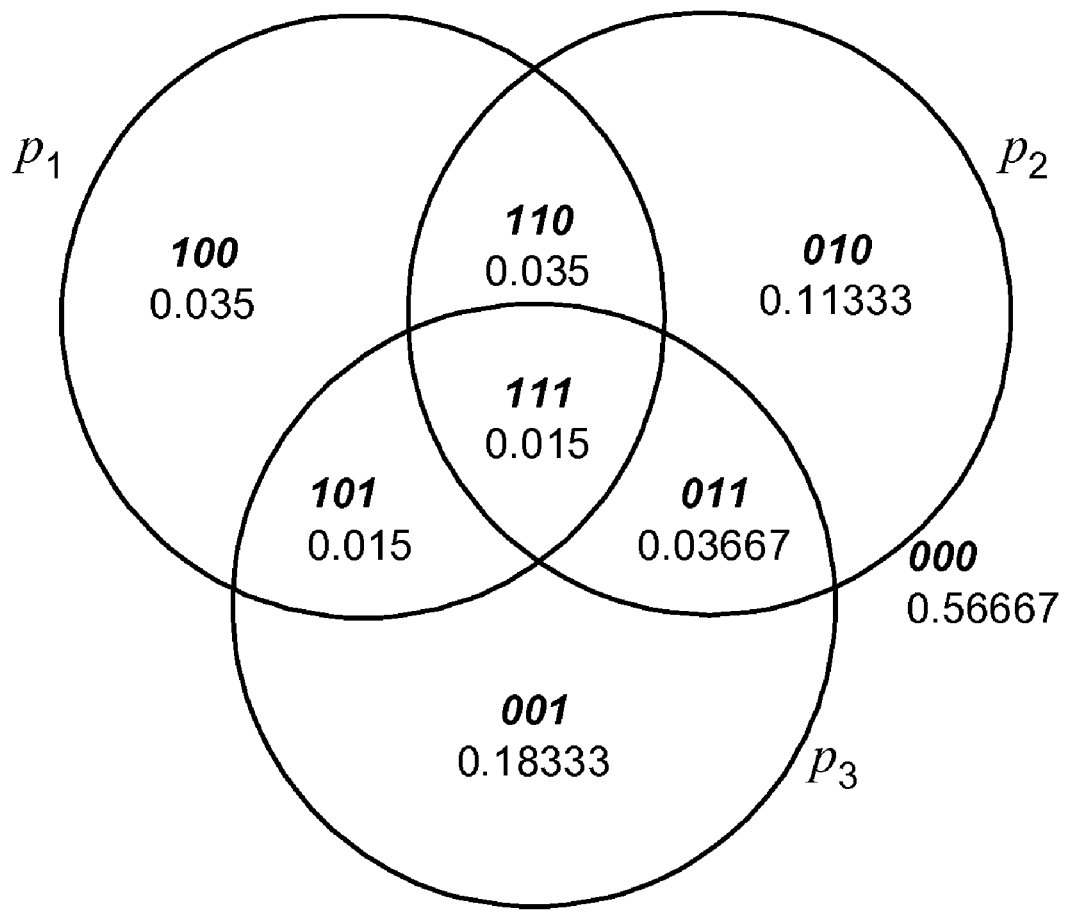
FIG. 3 illustrates a maximum entropy solution to the example probability space.

Shown in FIG. 3 are the results obtained when solving the constrained optimization problem presented above. For instance, in this ME solution, the selectivity estimate $s_{1,2,3} = x_{111} = 0.015$ and $s_{2,3} = x_{111} + x_{011} = 0.05167$ is obtained.

Discussed in this section is an algorithm to compute this result efficiently for an arbitrary number n of simple predicates P and an arbitrary set T of conjunctions over simple predicates, where the probabilities of the conjunctions are known. To solve the constrained optimization problem in its general form, the method of Lagrange multipliers is first applied to obtain a system of optimality equations. Since the entropy function is concave, a solution of this system yields the unique solution of the optimization problem. Specifically, we associate a Lagrange multiplier $\lambda_X$ with each known $s_X$. This includes $\lambda_\varnothing$, a multiplier associated with the constraint $s_\varnothing=1$. The Lagrangian is given by $$L(x,\lambda)=\Sigma_{b\in\{0,1\}^n}x_b\log x_b-\Sigma_{X\in T}\lambda_X(\Sigma_{b\in C(X)}x_b-s_X)$$

Taking derivatives and setting them equal to zero yields the optimality equations:

$$\ln x_b+1=\Sigma_{X\in P(b,T)}\lambda_X. \quad (3)$$

The present invention also provides for a database query optimizer computing cardinalities of each partial query execution plan, wherein the database query optimizer comprises a selectivity computing unit to compute the selectivity of one or more predicates based on known statistical information in a given probability space, and a missing selectivity computing unit to compute missing selectivities using constrained optimization approach and entropy maximization over the entire probability space. In this embodiment, the computed selectivities based on statistical information and computed missing selectivities based on constrained optimization approach and entropy maximization are used to provide improved cardinality estimates and reduced query execution times.

The present invention's approach to incorporate partial information about multivariate distributions in a constrained optimization form comprises: modeling one or more multivariate distributions based on available statistical information in a probability space, and modeling one or more multivariate distributions for which no statistical information is available via a constrained optimization approach and entropy maximization over the entire probability space. The present invention takes into account all available statistical information.

The constrained optimization approach of the present invention further comprises: defining a selectivity, $x_b$, associated with each atom, $\wedge_{i\in N} p_i^{b_i}$ for $b_i \in\{0,1\}$ (each atom representing a term in disjunctive normal form (DNF) over a predicate space of n predicates $p_i$), forming a plurality of constraints based on known selectivities, and computing a solution for all atoms $x_b$, $b_i\in\{0,1\}$ that maximizes entropy while minimizing the function $\Sigma_{b\in\{0,1\}^n}x_b\log x_b$ and satisfying said plurality of constraints.

Computing a solution for all atoms $x_b$, $b_i\in\{0,1\}$ that maximizes entropy while minimizing the function $\Sigma_{b\in\{0,1\}^n}x_b\log x_b$ and satisfying said plurality of constraints is accomplished via any of the following: the iterative scaling algorithm, the Newton-Raphson method, or closed formulas.

The Iterative Scaling Embodiment

Shown in FIG. 4 is the iterative scaling algorithm used in conjunction with the present invention. By making the substitution $z_X=e^{\lambda_X}$, an equivalent exponential form is obtained:

$$x_b=\frac{1}{e}\prod_{X\in P(b,T)}z_X. \quad (4)$$

Using equation (4) to eliminate $x_b$ in equation (2), the following is obtained $$\Sigma_{b\in C(Y)}\Pi_{X\in P(b,T)}z_X=s_Y e. \quad (5)$$

It is usually not possible to analytically compute the Lagrange multipliers $Z=(z_1,\ldots,z_{|T|})$ satisfying equation (5). A variant of the iterative scaling algorithm is used to efficiently obtain an approximate ME solution. The algorithm's main objective is to produce a new set Z of multipliers by iteratively refining the old $Z^0$. Each iteration consists of $|T|$ steps, during each of which the algorithm selects one $Y\in T$ and changes only the multiplier $z_Y$ associated with the constraint induced by $s_Y$, while keeping the other multipliers constant. Therefore, temporarily the current equation (5) is satisfied for Z.

From equation (5) the common Lagrange multiplier $z_Y$ is factored out. Because this multiplier occurs in all summands on the left side, a solution for $z_Y$ is found to obtain the iterative scaling equation:

$$z_Y=\frac{s_Y*e}{\sum_{b\in C(Y)}\prod_{X\in P(b,T)\setminus\{Y\}}z_X} \quad (6)$$

During each iteration step, the algorithm visits all members of Z, updating the value according to (6) for each $z_Y$, including $Y=\varnothing$. The sequence of iterated solutions converges to some limit Z, and the algorithm terminates when the difference between successive solutions becomes negligible. Z is then used to compute the values for the unknown $x_b$ using equation (4), which, in turn, is used to compute $s_X$ for $X\notin T$.

The Newton-Raphson Embodiment

In this embodiment, the constraint optimization problem is solved in its general form making use of the Newton-Raphson algorithm to numerically find a root of a complicated function or curve. Newton's method relies on the observation that this tangent line often intersects with the x-axis at a closer approximation to the function's root. Hence when trying to seek any $f(x)=0$ one often can find a better approximation to the root by:

$$x_{i+1}=x_i-\frac{f(x_i)}{f'(x_i)}$$

where $x_i$ is initialized with an initial guess. Applying this formula continuously on the obtained $x_{i+1}$, will result in a convergence of the x-value, and in a final guess of the function's root. When solving the constraint optimization problem the following set of equations are utilized:

$$\ln x_b+1-\Sigma\{\lambda_X|p(b)\}-\lambda_\varnothing=0 \quad (8)$$

$$\Sigma_{b\in C(X)}x_b-s_X=0 \quad (9)$$

These equations represent optimality conditions for the Maximum Entropy optimization problem. Equation (8) depends on the two variables $x_b$ and $\lambda_X$; the vector $y_X$ for the set of $\lambda_X$ s, including $\lambda_\varnothing$. Equation (9) depends on $x_b$. Furthermore, entire vector of functions in equation (8) is denoted by $F=(f_0,\ldots,f_{N-1})$ and the vector of functions in (9) by $G=(g_0,\ldots,g_{|T|-1})$. Roots are then approximated by Newton's method satisfying:

$$F_i(x_b,y_X)=0 \quad (10)$$

$$G_j(x_b)=0 \quad (11)$$

The function can be expressed as polynomials in the neighborhood of the vectors $x_b$ and $y_X$, hence can be expanded as the corresponding Taylor series:

$$F_i(x_b + \Delta x_b, y_X + \Delta y_X) = F_i(x_b, y_X) + \sum_{K=0}^{2^N-1} \frac{\partial F_i(x_b, y_X)}{\partial x_K} \Delta x_K + \quad (12)$$

$$\sum_{L=0}^{|T|-1} \frac{\partial F_i(x_b, y_X)}{\partial y_L} \Delta y_L + O(\Delta x_b^2) + O(\Delta y_X^2)$$

$$G_j(x_b + \Delta x_b) = G_j(x_b) + \sum_{K=0}^{2^N-1} \frac{\partial G_j(x_b)}{\partial x_K} \Delta x_K + O(\Delta x_b^2) \quad (13)$$

The only remaining part necessary for consideration is the nonlinear unknown part of equations (12) expressed by: $O(x_b^2) + O(y_X^2)$ and the nonlinear unknown part of (13) expressed as $O(x_b^2)$. Since an approximation is sought, these nonlinear parts are neglected and the remaining system of linear equations is solved. Matrices in the Taylor series are Jacobian matrices. Let these Jacobian matrices be denoted as follows:

$$JF_ix_b \equiv \frac{\partial F_i}{\partial x_b}$$

$$JF_iy_X \equiv \frac{\partial F_i}{\partial y_X}$$

$$JG_jx_b \equiv \frac{\partial G_j}{\partial x_b}$$

$$JG_jy_X \equiv \frac{\partial G_j}{\partial y_X}$$

This gives rise to the following matrix notation $A*h=d$:

$$\begin{pmatrix} JF_ix_b & JF_iy_X \\ JG_jx_b & JG_jy_X \end{pmatrix} * \begin{pmatrix} \Delta x_b \\ \Delta y_X \end{pmatrix} - \begin{pmatrix} F_i(x_b, y_X) \\ G_j(x_b) \end{pmatrix} = 0 \quad (14)$$

Subsequently, the system of linear equations in (14) is iteratively solved for the vector h in this Newton Raphson algorithm embodiment of the present invention. In each iterative step, the solution vector h is used, to update the current $x_b$ and $y_X$:

$$x_{b+1} = x_b + \Delta x_b \quad (15)$$

$$y_{X+1} = y_X + \Delta y_X \quad (16)$$

Thus, the next approximation of the roots of (10) and (11) are obtained. In contrast to the iterative scaling algorithm, the $x_b$ and $y_X$ values are not changed one at a time, but all at once. The calculations of (14), (15), (16) are continuously performed, until the vectors $\Delta x_b$ and $\Delta y_X$ of the solution vector h are approximately zero. At this point, the constraints of equations (8) and (9) are best approximated for all $x_b$ and $y_X$, and hence satisfy the Maximum Entropy Principle. The final values of $x_b$ then can be used to calculate the unknown values $s_X$ for $X \notin T$.

An important pre-processing step for the Newton Raphson approach is to properly define the starting values for the set of $x_b$. To guarantee a convergence of the solution vector h, these initial values should not randomly be assigned. A sophisticated approach to solve this problem is given by linear programming. By minimizing an objective function subject to the constraints given by all known T, expressed as lower and upper boundaries, and the constraints $0 \leq x_b \leq 1$ expressed as upper and lower boundaries either, a simplex algorithm is utilized to determine the optimal starting point for the algorithm expressed in $x_b$. Thus, not only is the convergence behavior of the algorithm improved, but also the steps necessary for iterations are minimized as well. This is because the values are already given a consistent distribution and well-defined direction.

Integration into DB2 Optimizer

The existing DB2 UDB optimizer precomputes selectivities from single-column statistics and MVS prior to plan enumeration, costing, and selection. When costing a plan that involves a conjunctive predicate p, the optimizer estimates p's selectivity by using a precomputed selectivity if available, or else combining several precomputed selectivities using the previously mentioned ad hoc method outlined. The optimizer takes precautions to avoid inconsistencies by keeping track of how a missing estimate for a predicate p was computed when it is first requested by a subplan during join enumeration. Subsequent requests for p's selectivity estimate will use this recorded information to ensure that the estimate is always derived in the same way. While this approach avoids inconsistencies, it does not utilize all available information as outlined previously and also causes an arbitrary bias towards particular plans, depending on how the selectivity was derived initially; this initial derivation depends in turn on the order in which selectivity estimates are requested during optimization.

The ME model of the present invention is seamlessly integrated into the DB2 UDB optimizer. The pre-computation phase is extended to not only compute selectivities based on statistical information, but also to pre-compute all missing selectivities using the iterative scaling algorithm. This pre-computation eliminates the need to use the heuristics for costing. It also eliminates the need to keep track of how selectivities were combined in order to avoid inconsistencies during estimation, because the ME estimates are inherently consistent with the statistics and generally applicable without causing any bias. The DB2 optimizer uses these pre-computed selectivity estimates during dynamic programming to compute the cardinalities of each partial QEP it considers. Extensions to the cardinality model enable the optimizer to use all available statistics in a consistent way, for all plans in the plan space. This improved knowledge results in better query plans and improved query execution times. Thus, the query optimizer's logic is simplified, as consistency checks and record-keeping are no longer necessary during cardinality estimation.

Even though the iterative scaling algorithm has a complexity of $O(|T| \cdot 2^{|P|})$, we often do not have to execute scaling for the entire predicate set P. In many situations, we can compute the maximum entropy solution by partitioning P into several independent subsets and by executing the scaling algorithm on each subset. This approach reduces the complexity substantially. In the following, we discuss several partitioning strategies that make the iterative scaling algorithm feasible for even extremely complex queries.

Complexity Reduction by Creating Relevant Partitions

P can be partitioned into non-overlapping subsets and simplified, depending on the available knowledge T, reducing the dimensionality of the problem space and thus the complexity of the scaling algorithm. Suppose that (a) for $U \subset N$, $s_U$ is known or can be computed (possibly with closed formulas) in a way consistent with the ME principle using only a subset of the information in T, and (b) the selectivities $s_X$ with $X \subset U$ are not important. Then it is possible to replace the predicates denoted by U in P with a single predicate, reducing $|P|$, $|T|$, and the overall complexity of the problem. Below we provide several examples of when this is possible.

If T does not contain any information about a subset U of N, except for the single selectivities (i.e., $|X|=1$ for all $X \in U$), then the selectivity $s_U$ can be computed as $s_U = \Pi_{i \in U} s_i$. All simple predicates $p_i$, $i \in U$, can then be removed from P, and all pieces of knowledge in T that intersect U can be removed, creating a new set of knowledge T*. Adding a new single predicate U with known selectivity thus reduces the complexity of iterative scaling to $O(|T^*| \cdot 2^{|P|-|U|+1})$. Similarly, for $U \in T$ and $|U|>1$, all simple predicates $p_i$, $i \in U$, can be removed from P and replaced by a new single predicate $p_U$ with known selectivity, again reducing the complexity of iterative scaling to $O(|T^*| \cdot 2^{|P|-|U|+1})$. Also, for the special case in which S contains knowledge as described in Section 4.1, Case 2.2, the selectivity of U can be computed as described there, and the complexity can be reduced to $O(|T^*| \cdot 2^{|P|-2})$.

The general approach to reducing complexity uses a preprocessing step in which the predicate space P is partitioned into independent components of nonintersecting knowledge based on both T and additional information about the relevance of the selectivities within each component. The selectivity of each component is computed either by using closed formulas or running iterative scaling; the latter process is fast because each component has relatively low complexity.

Complexity Reduction by Discovery of Implications

It is sometimes possible to identify a priori certain atoms b for which the input knowledge T implies that the selectivity $x_b$ is zero. Iterative scaling can then exclude these atoms from the iteration step (8) in the algorithm. There are two ways to deduce from T that $x_b = 0$ for some $b \in \{0,1\}^n$.

(a) If $s_X = 0$ for some $X \in T$, then $x_b = 0$ for all atoms $b \in C(X)$. None of these atoms need to be considered by the iterative scaling algorithm.

(b) If two sets of atoms A and B with $B \subset A$ have the same selectivity, i.e., $\Sigma_{b \in B} x_b = \Sigma_{b \in A} x_b$, then $x_b = 0$ for $b \in A \backslash B$, and these atoms can be ignored as well.

These simple pre-processing steps significantly reduce the number of iterations needed for convergence. For several real-world queries and real-world data, the running time was improved by orders of magnitude, producing ME distributions for more than twenty predicates on a single table with sub-second execution times.

Additionally, the present invention provides for an article of manufacture comprising computer readable program code contained within implementing one or more modules to utilize all available conjunctive predicate information to predict selectivities during query plan optimization. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: modeling one or more multivariate distributions based on available statistical information in a probability space, modeling one or more multivariate distributions for which no statistical information is available via a constrained optimization approach and entropy maximization over said probability space, and wherein said method takes into account all available statistical information.

CONCLUSION

A system and method has been shown in the above embodiments for the effective implementation of selectivity estimation for conjunctive predicates in the presence of partial knowledge about multivariate data distributions. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by type of algorithm used to solve the constrained optimization problem, software/program, computing environment, or specific computing hardware.

The above enhancements are implemented in various computing environments. For example, the present invention may be implemented on a conventional IBM PC or equivalent, or relational database. All programming and data related thereto are stored in computer memory, static or dynamic, and may be retrieved by the user in any of: conventional computer storage or display (i.e., CRT) formats. The programming of the present invention may be implemented by one of skill in the art of database programming.

The invention claimed is:

1. A computer-based method implemented in a query optimizer to incorporate partial information about multivariate distributions in a constrained optimization form, said method comprising:
    modeling one or more multivariate distributions based on available statistical information in a probability space;
    modeling one or more multivariate distributions for which no statistical information is available via a constrained optimization approach and entropy maximization over said probability space;
    estimating cardinality based on all available statistical information and both of said modeled distributions during cardinality estimation, and
    outputting said estimated cardinality,
    wherein said method further comprises a preprocessing step, said preprocessing comprising: partitioning a predicate space into independent components of nonintersecting knowledge based on both available knowledge and additional information about relevance of selectivities within each component; identifying, a priori, one or more atoms b for which input knowledge T implies that selectivity $x_b$ is zero, and excluding such atoms in computations of said constrained optimization approach, wherein selectivity $x_b$ is deduced to be zero: only (a) when $s_x = 0$ for $X \in T$, then $x_b = 0$ for all atoms $b \in C(X)$, where $s_x$ is the selectivity of predicate $p_x$ and $C(X)$ is the set of all atoms contributing to predicate $p_x$, or (b) when two sets of atoms A and B with $B \subset A$ have the same selectivity, i.e., by utilizing the equation $\Sigma_{b \in B} x_b = \Sigma_{b \in A} x_b$, then $x_b = 0$ for $b \in A \backslash B$.

2. An article of manufacture comprising a non-transitory computer useable medium having computer readable program code embodied therein which, when executed by a computer, implements a database query optimizer computing cardinalities of each partial query execution plan comprising, said computer usable medium comprising:
    computer readable program code implementing a selectivity computing unit to compute the selectivity of one or more predicates based on known statistical information in a given probability space;
    computer readable program code implementing a missing selectivity computing unit to compute missing selectivities using a constrained optimization approach and entropy maximization over said probability space, and wherein said computed selectivities based on statistical information and computed missing selectivities based on constrained optimization approach and entropy maximization are used to provide improved cardinality estimates and reduced query execution times, wherein said medium further comprises computer readable program code implementing a preprocessing step, said preprocessing comprising: partitioning a predicate space into independent components of nonintersecting knowledge based on both available knowledge and additional information about relevance of selectivities within each component; identifying, a priori, one or more atoms b for which input knowledge T implies that selectivity $x_b$ is zero, and excluding such atoms in computations of said constrained optimization approach, wherein selectivity $x_b$ is deduced to be zero: only (a) when $s_x=0$ for $X \in T$, then $x_b=0$ for all atoms $b \in C(X)$, where $s_x$ is the selectivity of predicate $p_x$ and $C(X)$ is the set of all atoms contributing to predicate $p_x$, or (b) when two sets of atoms A and B with $B \subset A$ have the same selectivity, i.e., by utilizing the equation $\Sigma_{b \in B} x_b = \Sigma_{b \in A} x_b$, then $x_b=0$ for $b \in A \backslash B$.

3. An article of manufacture comprising a non-transitory computer useable medium having computer readable program code embodied therein which incorporates partial information about multivariate distributions in a constrained optimization, said medium comprising:

computer readable program code modeling one or more multivariate distributions based on available statistical information in a probability space;

computer readable program code modeling one or more multivariate distributions for which no statistical information is available via a constrained optimization approach and entropy maximization over said probability space;

computer readable program code estimating cardinality based on all available statistical information and both of said modeled distributions during cardinality estimation, and computer readable program code outputting said estimated cardinality, wherein said medium further comprises computer readable program code implementing a preprocessing step, said preprocessing comprising: partitioning a predicate space into independent components of nonintersecting knowledge based on both available knowledge and additional information about relevance of selectivities within each component; identifying, a priori, one or more atoms b for which input knowledge T implies that selectivity $x_b$ is zero, and excluding such atoms in computations of said constrained optimization approach, wherein selectivity $x_b$ is deduced to be zero: only (a) when $s_x=0$ for $X \in T$, then $x_b=0$ for all atoms $b \in C(X)$, where $s_x$ is the selectivity of predicate $p_x$ and $C(X)$ is the set of all atoms contributing to predicate $p_x$, or (b) when two sets of atoms A and B with $B \subset A$ have the same selectivity, i.e., by utilizing the equation $\Sigma_{b \in B} x_b = \Sigma_{b \in A} x_b$, then $x_b=0$ for $b \in A \backslash B$.

4. The computer-based method of claim 1, wherein said query optimizer works in conjunction with a database accessible over a network.

5. The computer-based method of claim 4, wherein said network is any of the following: local area network, wide area network, or the Internet.

6. The article of manufacture of claim 2, wherein said database query optimizer works in conjunction with a database accessible over a network.

7. The article of manufacture of claim 6, wherein said network is any of the following: local area network, wide area network, or the Internet.

8. The article of manufacture of claim 3, wherein said constrained optimization is implemented using a query optimizer works that in conjunction with a database accessible over a network.

9. The article of manufacture of claim 8, wherein said network is any of the following: local area network, wide area network, or the Internet.

* * * * *